United States Patent
Grein et al.

(10) Patent No.: US 11,118,919 B2
(45) Date of Patent: Sep. 14, 2021

(54) METHOD FOR DETERMINING A ROUTE AND TIME FRAME FOR THE TRAVEL OF A MOTOR VEHICLE, AND MOTOR VEHICLE

(71) Applicant: Bayerische Motoren Werke Aktiengesellschaft, Munich (DE)

(72) Inventors: Daniel Grein, Novato, CA (US); Julia Niemann, Munich (DE); Julian Eichhorn, Munich (DE); Marc Breisinger, Munich (DE); Philipp Suessenguth, Munich (DE); Benjamin Kuhn, Unterfoehring (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 249 days.

(21) Appl. No.: 15/852,341

(22) Filed: Dec. 22, 2017

(65) Prior Publication Data

US 2018/0120117 A1   May 3, 2018

Related U.S. Application Data

(63) Continuation of application No. PCT/EP2016/064267, filed on Jun. 21, 2016.

(30) Foreign Application Priority Data

Jun. 23, 2015   (DE) ...................... 10 2015 211 562.3

(51) Int. Cl.
*G01C 21/34*   (2006.01)
*B60W 50/08*   (2020.01)
(Continued)

(52) U.S. Cl.
CPC ......... *G01C 21/343* (2013.01); *B60W 50/082* (2013.01); *G01C 21/3469* (2013.01); *G01C 21/3484* (2013.01); *G08G 1/096866* (2013.01)

(58) Field of Classification Search
CPC .............. G01C 21/343; G01C 21/3469; G01C 21/3484; G08G 1/096866; B60W 50/082
See application file for complete search history.

(56) References Cited

U.S. PATENT DOCUMENTS 5,790,976 A    8/1998  Boll et al.
9,188,985 B1 * 11/2015  Hobbs .................... G01C 21/34
(Continued)

FOREIGN PATENT DOCUMENTS

DE    195 19 107 C1    4/1996
DE    100 14 259 A1   10/2001
(Continued)

OTHER PUBLICATIONS

International Search Report (PCT/ISA/210) issued in PCT Application No. PCT/EP2016/064267 dated Nov. 7, 2016 with English translation (Six (6) pages).

(Continued)

*Primary Examiner* — Rodney A Butler
(74) *Attorney, Agent, or Firm* — Crowell & Moring LLP

(57) ABSTRACT

A method for determining a route and time frame for the travel of a motor vehicle which assists the driver in planning their travel and in making fuller use of the technical potential of the motor vehicle is provided. For this purpose, the method includes the following steps: acquiring at least one destination, determining a travel route to the at least one destination; acquiring an adjustable travel mode of the motor vehicle for at least one first section of the travel route; determining the route and time frame for the travel of the motor vehicle depending on the acquired travel mode; and displaying the route and time frame of the travel.

16 Claims, 2 Drawing Sheets

(51) Int. Cl.
*G08G 1/09* (2006.01)
*G08G 1/0968* (2006.01)

(56) References Cited

U.S. PATENT DOCUMENTS

| | | | |
|---|---|---|---|
| 10,185,327 B1* | 1/2019 | Konrardy | G08B 25/014 |
| 2007/0106465 A1 | 5/2007 | Adam et al. | |
| 2009/0326750 A1* | 12/2009 | Ang | B60W 50/082 |
| | | | 701/22 |
| 2011/0032110 A1 | 2/2011 | Taguchi | |
| 2011/0112710 A1 | 5/2011 | Meyer-Ebeling et al. | |
| 2011/0264364 A1 | 10/2011 | Herchenroeder | |
| 2013/0035837 A1* | 2/2013 | Johansson | B60W 10/06 |
| | | | 701/98 |
| 2014/0163854 A1 | 6/2014 | Matsumoto et al. | |
| 2014/0210608 A1* | 7/2014 | Yamada | G07C 5/00 |
| | | | 340/459 |
| 2014/0288757 A1* | 9/2014 | Hirasawa | B60W 50/10 |
| | | | 701/22 |
| 2015/0127200 A1* | 5/2015 | Takeuchi | F02D 29/02 |
| | | | 701/22 |
| 2015/0149017 A1 | 5/2015 | Attard et al. | |
| 2016/0009291 A1* | 1/2016 | Pallett | B60W 50/085 |
| | | | 701/23 |
| 2016/0339916 A1* | 11/2016 | Norton | B60W 30/16 |
| 2016/0371759 A1* | 12/2016 | Wilson | G06Q 30/0623 |
| 2017/0036662 A1* | 2/2017 | Chen | B60W 10/06 |

FOREIGN PATENT DOCUMENTS

| | | |
|---|---|---|
| DE | 10 2010 039 075 A1 | 2/2011 |
| DE | 10 2009 052 853 A1 | 5/2011 |
| DE | 10 2010 018 334 A1 | 10/2011 |
| DE | 10 2012 003 292 A1 | 6/2013 |
| DE | 11 2012 003 013 T5 | 4/2014 |
| DE | 10 2013 005 076 A1 | 9/2014 |
| EP | 0 785 519 A1 | 7/1997 |
| EP | 2 028 057 A2 | 2/2009 |
| WO | WO 2014/139821 A1 | 9/2014 |

OTHER PUBLICATIONS

German-language Written Opinion (PCT/ISA/237) issued in PCT Application No. PCT/EP2016/064267 dated Nov. 7, 2016 (Five (5) pages).

German-language Search Report issued in counterpart German Application No. 10 2015 211 562.3 dated Mar. 8, 2016 with partial English translation (Thirteen (13) pages).

* cited by examiner

METHOD FOR DETERMINING A ROUTE AND TIME FRAME FOR THE TRAVEL OF A MOTOR VEHICLE, AND MOTOR VEHICLE

CROSS REFERENCE TO RELATED APPLICATIONS

This application is a continuation of PCT International Application No. PCT/EP2016/064267, filed Jun. 21, 2016, which claims priority under 35 U.S.C. § 119 from German Patent Application No. 10 2015 211 562.3, filed Jun. 23, 2015, the entire disclosures of which are herein expressly incorporated by reference.

BACKGROUND AND SUMMARY OF THE INVENTION

The present invention relates to a method for determining a route and the time frame for the travel of a motor vehicle, and furthermore to a motor vehicle for performing the method.

Drivers of modern motor vehicles are supported by a plurality of driver assistance systems for the planning and execution of their driving tasks. Navigation systems in particular have been installed in great numbers in modern motor vehicles. Drivers are supported by them not only to help with orientation (i.e. when dealing with the question of finding the current location) but also in the planning and execution of navigating to the desired destination.

Modern motor vehicles also have powerful display devices, which can display to the driver complex information pertaining to local requirements. Examples of such display devices include freely programmable combination instruments and head-up displays.

Modern motor vehicles moreover can frequently be operated in different travel modes, which the driver can select freely or by taking into account certain boundary conditions. Travel modes can, for example, concern the drive mode of the motor vehicle. Modern motor vehicles are also now able to partially or wholly take over driving tasks. There is also a great deal of talk about partially automated, highly automated or fully automated (or automatic) driving in this context.

DE 10 2010 039 075 A1 discloses an output device for providing information on an electrical amount of energy. This discloses, among others, the display of a number of charging stations for an electric vehicle as well as a starting location and a target location. A travel time is indicated between individual locations and also, at the position of the respective location, a planned time of arrival.

DE 195 19 107 C1 also discloses a display of starting location, target location and charging stations. Provision is made to display as to whether charging stations are occupied or free. Moreover it can be displayed, whether the target can be reached without an intermediate charge or whether an intermediate charging station has to be used.

EP 0 785 519 A1 describes a route preparation system. The display can include a starting location, a target location as well as intermediate destinations together with the respectively associated planned arrival times.

Based on the prior art, there is a need for a method for determining a route and time frame for the travel of a motor vehicle, which offers an improved approach of supporting the driver in the planning of his travel and in the use of the technical possibilities of the motor vehicle.

This need is met by a method and a motor vehicle for determining a route and time frame for the travel of the motor vehicle in accordance with embodiments of the invention.

With the method according to the invention, initially at least one destination and a travel route to the at least one destination is acquired. It is understood that a number of destinations can be acquired. The order of the acquired destinations reveals, which destination is the final one of the journey and which destinations represent intermediate destinations. In case several destinations have been acquired the route comprises a plurality of partial routes between the respective destinations. In a further inventive step a drive mode setting of the motor vehicle for at least one first section of the travel route is determined. The at least one first section of the travel route may comprise the entire travel route. The at least one first section of the travel route may comprise an entire partial route, i.e. a route between two destinations. The at least one first section of the travel route may also comprise a random other part of the travel route. Further, as specified by the invention, the route and time frame for the travel of the motor vehicle can be determined and displayed depending on the acquired drive mode.

The invention thus offers the advantage, based on the options of route guidance known from the state of the art, of being able to determine and display the effect of setting or changing the drive mode on the route and time frame of the journey. This can, in particular with modern motor vehicles with a plurality of drive mode settings, support the driver when he decides on a certain drive mode.

It is definitely not provided by the method according to the invention to change the already acquired travel route to the at least one destination depending on the drive mode setting. In other words, the route guidance as such, i.e. determination of the travel route to the at least one destination, shall be acquired by the means known as such in the state of the art and shall not be changed when the method is being executed. On the contrary, the invention serves to determine the time-related effects of the choice of drive mode (for an unchanged travel route) and to display these to the driver.

Particularly advantageously, the step of acquiring at least one destination comprises acquiring a destination set by a navigation system and/or acquiring a calendar entry. The destination or destinations may thus be taken from a navigation system of the motor vehicle. In the navigation system the destination or destinations may have been set in advance manually by a user, in particular by the driver of the motor vehicle. Alternatively or additionally, the destination or destinations may be taken from a personal calendar of the user, in particular the driver of the motor vehicle. To this end provision may be made that an electronic device of the user, e.g. a driver's smart phone, includes a data connection (e.g. Bluetooth) to a motor vehicle unit executing the method, via which data connection data on calendar entries can be communicated. Calendar entries in a personal calendar of the user may, apart from a subject (i.e. a name of the appointment), contain particulars on the location and time of the appointment. These details can be used in acquiring the destination. With a particularly advantageous design, a number of future calendar entries can be used for displaying the complete envisaged route and time frame of the journey, in which the locations and times of all future dates of a certain period of time (e.g. of the actual day) are contained.

It is particularly advantageous if the drive mode setting includes a mode of automated driving, in particular a mode of partially automated, highly automated or fully automated driving. As mentioned in the beginning, modern motor vehicles will in the future, to an increasing extent, offer the possibility of taking over a part or all of his driving tasks from the driver. With highly automated or fully automated driving, the motor vehicle drives completely autonomously so that the driver can shift his attention away from the traffic scene and concentrate on other activities. However, automatically driving motor vehicles may be subject to certain restrictions, which may cause a change, in particular an extension of the travel time relative to a manual driving mode. For example, there may exist a speed restriction for automatically driving vehicles and/or a restriction on the use of a driving lane allocated an automated drive mode. The invention, in the said embodiment, offers the advantage of the driver being able to immediately recognize the effect of the choice of a mode of automated driving on the route and time frame for the travel. He can then decide if he wants to put up with the usually extended travel time so that he can perform other activities during the phase of highly or fully automated driving.

A further advantageous design of the invention is revealed if the motor vehicle is a hybrid vehicle driven by a combustion engine and/or an electric engine, wherein the drive mode setting includes a drive mode, in particular a drive mode based purely on a combustion engine or purely on an electric engine or based on a combined drive mode. The term 'hybrid vehicle' in this context is meant to cover all motor vehicles, which are equipped with both a combustion engine and an electric engine and which can be driven either exclusively by the combustion engine (fuel-powered drive mode) or exclusively by the electric engine (electromotive drive mode) or by both engines simultaneously (combined drive mode). As previously explained with reference to drive modes of automated driving, the selection of the drive mode may have repercussions on the route and time frame for the travel.

Further advantageously, the drive mode setting includes a motoring experience mode, in particular a sports mode, a comfort mode or an eco-mode. These drive modes differ from one another in their respective properties and in the fuel or energy consumption resulting therefrom. As such, in a sports mode for example, the maximum power of a combustion engine may be released which admittedly can increase the average fuel consumption, whereas in an eco-mode the power of the combustion engine may be limited, whereby the average fuel consumption may drop. As previously explained with reference to modes of automated driving, the choice of the motoring experience mode may also impact the route and time frame of the travel.

In one embodiment it may be provided that the step of acquiring the drive mode setting comprises acquiring a user input. The user input may, for example, consist in the driver choosing a mode of automated driving, a drive mode and/or a motoring experience mode by use of a control element. The embodiment offers the advantage that the impact of the user input on the route and time frame of the travel can be immediately displayed and thus made clear, to the driver.

With a further embodiment it may be provided, additionally or alternatively, that the step of acquiring the drive mode setting comprises automatically suggesting the drive mode setting. It is especially advantageous if automatically suggesting the drive mode setting is effected in dependence of at least one parameter selected from the group comprising:
 a road type,
 a route restriction, and
 an energy consumption and/or an energy store filling level of the motor vehicle.

A road type for example may be a highway, a country road, a local road or the like. A road restriction may be a route restriction. Or a road restriction may be that automated driving on a stretch of road is not allowed or prescribed. An energy consumption and/or an energy store filling level of the motor vehicle, in particular with an electric or hybrid vehicle, may be an electrical energy consumption/a (filling) or charge level of the vehicle battery.

Therefore, a drive mode may for example be automatically suggested, the setting of which will become obligatory as the journey progresses. For example, an electromotive drive mode could be automatically suggested then, when the journey of the motor vehicle passes through an area with emission restrictions, for example through a city center area where only electromotive travel is allowed. Or a drive mode may be automatically suggested, the setting of which may be recommended or made at all possible as the journey progresses. For example, a sports mode setting may be suggested when a winding country road lies ahead. A mode of highly-automated driving may be suggested before entering a motorway.

A further advantageous embodiment provides for a drive mode setting for the motor vehicle, which is required or recommended for managing the travel route to the at least one destination, to be acquired for at least one first section of the travel route depending on the acquired drive mode for the at least one first section of the travel route. In this case it is provided that the step of displaying the route and time frame of the travel includes displaying the required or recommended drive mode setting of the motor vehicle for the second section of the travel route. This further development of the invention advantageously takes into account the fact that utilizing the drive mode setting for the first section of the travel route may impact not only the time frame of the journey (as determined according to the invention) but may also impact the selection of drive modes which may be possible or recommendable as the journey progresses. To this end a required or recommended drive mode for a second section of the travel route is acquired in dependence of the acquired drive mode for the at least one first section of the travel route. It is also possible to acquire required or recommended drive modes for further sections, i.e. for a third, a fourth, etc. section of the travel route. This may be done depending on individual or all of the determined or acquired drive modes for the preceding section of the travel route. For example, a drive mode could be acquired for a fourth section of the travel route in dependence merely of the drive mode determined for the first section of the travel route. But it is also possible to acquire the drive mode for the fourth section of the travel route in dependence of the drive modes determined or acquired for the first, second and third section of the travel route.

For example, a sports mode setting may have been acquired as a drive mode setting for a first section of the travel route. The sports mode could for example have been automatically prescribed because the first section of the travel route includes a winding country road. Since in sports mode energy consumption (for example a consumption of fuel and/or electric energy) could be relatively high, a drive mode with low energy consumption (e.g. an eco-mode) could be recommended or even be necessary for the further journey to the destination, in order to reach the destination. Depending on the sports mode determined for the first section, an eco-mode could therefore be determined for the second section (which for example covers the further travel route up to the destination). The step of displaying the route and time frame for the travel then comprises displaying the eco-mode for the second section of the travel route. In another example the drive mode setting for the first section could be a mode of highly automated driving, which is determined by means of a user input of the driver. Compared to travelling in manual drive mode the mode of highly automated driving could cost additional time so that depending on the mode of highly automated driving determined for the first section, a sports mode could be acquired for the second section (which for example covers the further travel route up to the destination), in order to ensure that the destination can be reached in good time (as e.g. specified in the calendar entry).

In a further design, the step of displaying the route and time frame for the travel includes displaying a starting location, at least one destination and the at least one first section of the travel route. Displaying the at least one destination includes displaying a predicted arrival time at the at least one destination. Moreover displaying the at least one first section of the travel route includes displaying the acquired drive mode setting for the first section of the travel route. In other words provision is made for all essential information to be displayed in summary to the user, for example in a kind of timeline.

Even more advantageously, at least two alternative drive mode settings of the motor vehicle are acquired for the at least one first section of the travel route. Depending on the acquired drive modes, at least two routes and time frames for the travel of the motor vehicle are then determined. Finally, the step of displaying includes displaying the routes and time frames for the travel simultaneously. This is a particularly advantageous way of showing the driver the effects of a decision made by him between at least two available drive modes.

The invention is also implemented by a motor vehicle with means for performing the above-described method. A motor vehicle according to the invention has at least two drive mode settings, a display device and a navigation system. Carrying out the method steps may be effected in a control unit of the motor vehicle provided for this purpose. To this end, a control unit of the motor vehicle functioning, for example, as a central computer can be adapted by suitable programming.

Other objects, advantages and novel features of the present invention will become apparent from the following detailed description of one or more preferred embodiments when considered in conjunction with the accompanying drawings.

DETAILED DESCRIPTION OF THE DRAWINGS

In the figures identical reference symbols denote identical features of the shown embodiment of the invention. It is pointed out that the figures depicted merely show exemplary embodiments of the invention. In particular depictions of feature combinations in the figures and/or in the description of the figures should not be interpreted as meaning that the invention requires the realization of all said features under any circumstances. Other embodiments of the invention may contain fewer, more and/or other features. In addition it is pointed out that the illustrations represent principal depictions of embodiments of the invention. The chosen arrangement of individually shown elements in relation to each other is merely an exemplary arrangement and different arrangements may be chosen for other embodiments of the invention. Furthermore, the illustrations are not necessarily drawn to scale. Individual features may be shown enlarged or reduced in size in order to improve the illustration.

Figure 1:
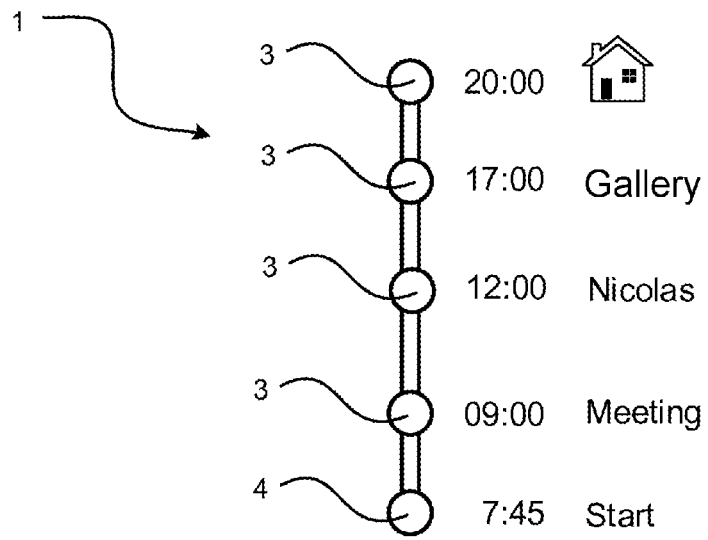
FIG. 1 shows a view of a route and time frame for the travel according to the prior art.

FIG. 1 shows a view of a route and time frame 1 for a journey as known from the prior art. The route and time frame 1 begins at start point 4, which is denoted by a time of day and the name "start". The time may be a current time of day or the scheduled starting time. The destinations 3 are arranged along a timeline starting from start point 4. They are each labelled with the time of day at which they are supposed to be reached and a label of the destination. The name of the destination may be the name of a calendar entry (e.g. "Nicolas") associated with the destination 3 and/or the name of the location of the destination 3 (e.g. "gallery"). Or the name may be a symbol, for example the house symbol for "home" shown in FIG. 1. In the illustration of the route and time frame 1, times which are not travel times, may be shown separately, which is however not the case in FIG. 1.

Figure 2:
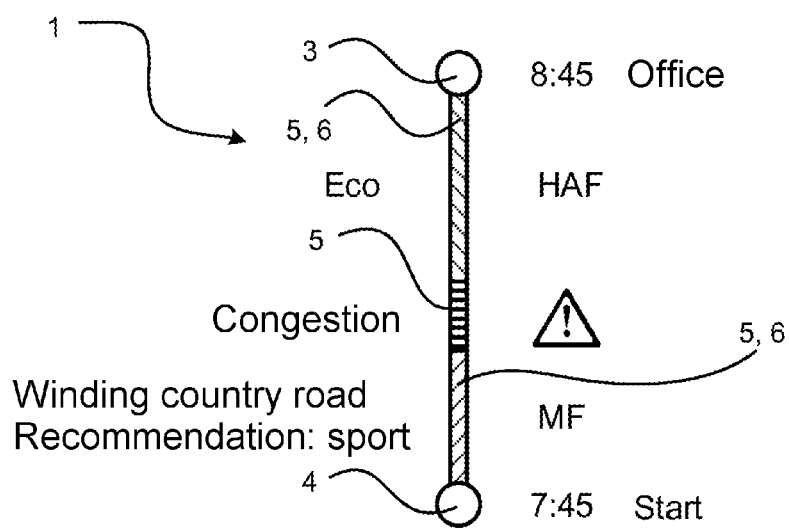
FIG. 2 shows a view of a route and time frame for the travel determined by a first embodiment of the method according to the invention.

FIG. 2 shows an exemplary view of a route and time frame 1 determined by a first embodiment of the method according to the invention. The route and time frame 1 begins at the start point 4 and finishes at the destination 3. The example shown shows a journey from the start point 4 to the destination 3 "office". The timeline chosen for the illustration of the route and time frame 1 comprises three different sections 5 of the travel route.

In the present example, the destination 3 ("office") may have been acquired from a driver's personal electronic calendar. To this end it is not absolutely necessary for the calendar to contain the destination 3 explicitly as an appointment. Rather, the destination 3 may be extracted indirectly from an existing calendar entry. For example, the calendar may have an entry for a meeting in the office scheduled for 9:00 o'clock. Based on the current time of day, which for example may be the time "7:45" shown next to the start point 4, the destination 3 acquired may be the office which is to be reached by 9:00 o'clock at the latest (if not earlier).

The route from the start point 4 to the destination 3 is determined via the vehicle's navigation system. In the present example a first section 5 as viewed from the start point 4 leads along a winding country road. This is shown as an explanatory hint in the view of FIG. 2. In the present example, it is provided that a drive mode setting 6 of the motor vehicle includes a mode of automated driving and a motoring experience mode, in particular a sports mode. The vehicle in this example may also have a drive mode 6 which is a combination of a mode of highly automated driving and an eco-mode.

The motor vehicle in the present example acquires the drive mode setting 6 for the first section 5 of the route by automatically suggesting a sports mode. In other words the vehicle recognizes that the sports mode is best suited for the winding country road and therefore automatically suggests this drive mode 6. The suggestion is communicated to the driver by way of the recommendation shown in FIG. 2. The displayed hint "winding country road" serves to explain to the driver the reasons for the automatic suggestion. The route further includes a second route section 5 ("congestion") and a third route section 5.

The route and time frame 1 of the motor vehicle is determined depending on the automatically acquired drive mode 6 for the first section. To this end, in the present example, a drive mode 6 recommended for the third section 5 of the route is additionally acquired depending on the determined sports mode 6 for the first section 5 of the route. Due to the increased energy consumption (fuel consumption and/or consumption of electric energy) to be expected in the sports mode 6 and the congestion to be expected in the second section 5, the destination can only be reached if the third section is traveled in an energy-saving drive mode 6, which in the present example is the combination mode 6 (eco-mode with highly automated driving, HAF). In the figure this is represented by corresponding hints ("HAF", "eco") as well as by a corresponding design of the sections 5 of the timeline.

The driver is able to recognize with one glance when looking at FIG. 2, i.e. the result of the described method, what the implications are as regards the choice of drive mode in view of the anticipated arrival times as well as in view of any possible restrictions regarding available drive modes, which are necessary for managing the further route sections 5.

It may be provided that the drive mode 6 for the first section 5 is determined by a manual input of the driver. This may be done in combination with the described automatic suggestion of drive mode 6. For example, it may be provided that the driver can "flip through" all available drive modes for the first section 5 by operating a respective control element. The method could be repeated with each change of the drive mode so that displaying the route 1 changes correspondingly to the respectively selected drive mode 6, for the first section 5. In this way the driver can quickly determine the available options and the resulting consequences for the route and time frame 1.

Figure 3:
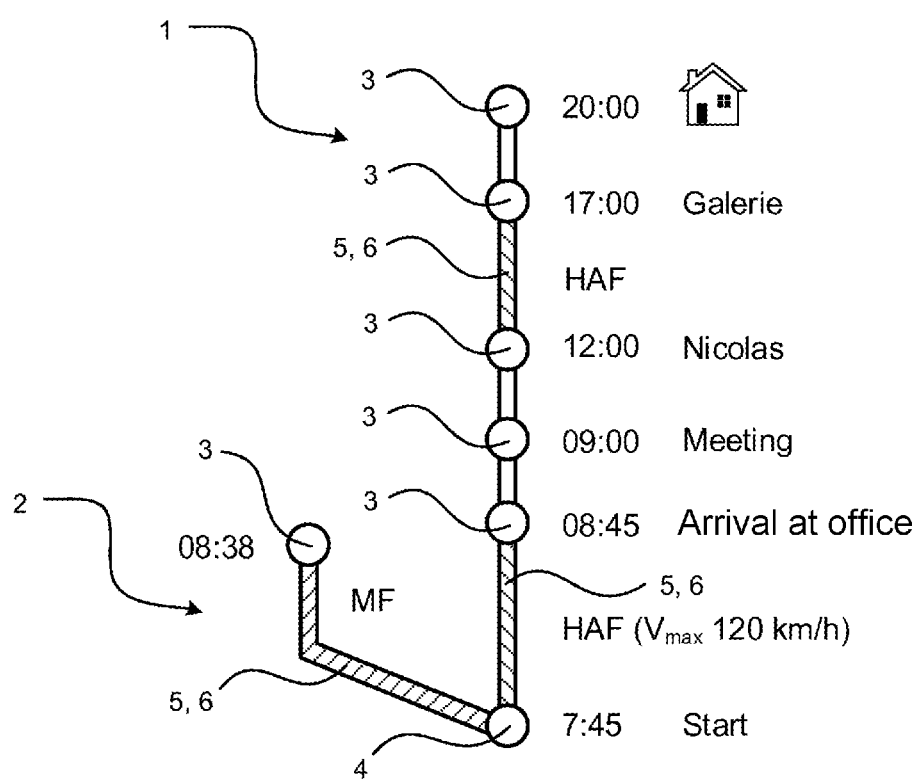
FIG. 3 shows a view of two routes and time frames for the travel determined by a second embodiment of the method according to the invention.

A second exemplary embodiment of the invention provides for all or some available alternative route and time frames to be displayed simultaneously. To this end FIG. 3 shows an exemplary view of two route and time frames 1, 2 determined by the second embodiment of the method according to the invention.

Both route and time frames 1, 2 have the same start point 4. A first determined destination 3 is the location "office" as already described with reference to FIG. 1 and FIG. 2. The first route and time frame 1 includes further destinations 3 and intermediate sections 5. A drive mode 6 of highly automated driving (HAF) is displayed for section 5 between the destinations 3 "Nicolas" and "gallery".

The further destinations 3 ("meeting", "Nicolas", "gallery" and "home") may also be part of the second route and time frame 2 shown. This is, however, not depicted in FIG. 3. The way this is shown is not merely for reasons of better clarity. It is meant to point out the possibility that only the respective next destination 3 is shown.

As regards the first section 5 there is the choice between a mode of highly automated driving (HAF) and a manual drive mode (MF). Both alternative drive mode settings 6 are determined according to the invention. Then the two alternative route and time frames 1, 2 are determined and simultaneously displayed depending on the acquired drive modes 6. The driver can thus recognize at one glance which options are available to him. In the example depicted, the driver can decide on the manual drive mode 6, whereby he will reach the office quicker (route and time frame 2). He can also decide on a mode (mode 6) of highly automated driving, whereby he reaches the office later, but is able to pursue activities during the journey not connected with driving (route and time frame 1).

In the route and time frame 1, the hint to the mode of highly automated driving ("HAF") for the first section 5 is provided with the additional hint to a maximum speed ("Vmax 120 km/h") applicable in this drive mode 6. This speed restriction is the reason for an arrival at the office in drive mode 6 of highly automated driving being later than in the alternative manual mode 6 of the route and time frame 2. The hint to the speed restriction for the driver represents additional explanatory information. As a result, the driver's confidence in the method according to the invention can be increased.

LIST OF REFERENCE SYMBOLS

1,2 route and time frame (depiction)
3 destination
4 start point
5 section of route
6 drive mode The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for determining a travel route and a time frame for travel of a motor vehicle, the method comprising the steps of:
    acquiring at least one destination;
    acquiring a travel route to the at least one destination;
    receiving a selection of a first drive mode setting from a plurality of drive mode settings of the motor vehicle for at least one first section of the travel route;
    depending on the selected first drive mode setting, determining a second drive mode setting from the plurality of drive mode settings of the motor vehicle for at least one second section of the travel route which is required or recommended for traveling to the at least one destination;
    determining the travel route and the time frame for the travel of the motor vehicle depending on the selected first drive mode setting and the second drive mode setting; and
    displaying the travel route, the time frame, and the second travel mode.

2. The method as claimed in claim 1, wherein the step of acquiring the at least one destination comprises acquiring a destination set in a navigation system and/or acquiring a calendar entry.

3. The method as claimed in claim 1, wherein a drive mode setting of the plurality of drive mode settings comprises a mode of automated driving.

4. The method as claimed in claim 1, wherein a drive mode setting of the plurality of drive mode settings comprises a mode of partially, highly or fully automated driving.

5. The method as claimed in claim 1, wherein
    the motor vehicle is both a fuel-powered and electrically powered hybrid motor vehicle, and
    a drive mode setting of the plurality of drive mode settings comprises a purely fuel-powered, purely electrically powered or combined drive mode.

6. The method as claimed in claim 1, wherein a drive mode setting of the plurality of drive mode settings comprises a motoring experience mode.

7. The method as claimed in claim 1, wherein a drive mode setting of the plurality of drive mode settings comprises a sports mode, comfort mode or eco-mode.

8. The method as claimed in claim 1, wherein the step of receiving a selection of the drive mode setting comprises acquiring a user input.

9. The method as claimed in claim 1, further comprising:
automatically suggesting a drive mode setting from the plurality of drive mode settings.

10. The method as claimed in claim 9, wherein the automatically suggesting the drive mode setting depends on at least one parameter selected from the group consisting of:
a road type,
a route restriction, and
an energy consumption and/or an energy store filling level of the motor vehicle.

11. The method as claimed in claim 1, wherein the step of displaying the travel route and time frame further comprises displaying:
a start point,
the at least one destination, and
the at least one first section of the travel route, wherein:
displaying the at least one destination comprises displaying an anticipated arrival time at the at least one destination, and
displaying the at least one first section of the travel route comprises displaying the selected drive mode setting of the plurality for the first section of the travel route.

12. The method as claimed in claim 1, further comprising:
acquiring a second travel route depending on and corresponding to the second drive mode setting of the plurality of drive mode settings;
determining a second time frame corresponding to the second travel route; and
simultaneously displaying the travel routes and the corresponding time frames.

13. A motor vehicle, comprising:
at least two drive mode settings of the motor vehicle;
a display device;
a navigation system; and
a control unit operatively configured to carry out the method of claim 1.

14. A non-transitory computer-readable medium comprising instructions operable, when executed by one or more computing systems, to:
acquire at least one destination;
acquire a travel route to the at least one destination;
receive a selection of a first drive mode setting from a plurality of drive mode settings of the motor vehicle for at least one first section of the travel route;
depending on the selected first drive mode setting, determine a second drive mode setting from the plurality of drive mode settings of the motor vehicle for at least one second section of the travel route which is required or recommended for traveling to the at least one destination;
determine the travel route and the time frame for the travel of the motor vehicle depending on the selected first drive mode setting and the second drive mode setting; and
display the travel route, the time frame, and the second travel mode.

15. The method as claimed in claim 1, further comprising:
acquiring an additional travel route to the at least one destination in response to the received selection of the drive mode setting; and displaying the additional travel route and the corresponding time frame.

16. The method as claimed in claim 15, wherein
the travel route and the additional travel route each further comprise one or more intermediate destinations; and
at least one intermediate destination is common to both the travel route and the additional travel route.

* * * * *